US010669617B2

United States Patent
Gatto et al.

(10) Patent No.: US 10,669,617 B2
(45) Date of Patent: *Jun. 2, 2020

(54) METHODS FOR PROCESSING BONDED DUAL ALLOY ROTORS INCLUDING DIFFERENTIAL HEAT TREATMENT PROCESSES

(71) Applicant: HONEYWELL INTERNATIONAL INC., Morris Plains, NJ (US)

(72) Inventors: Christopher David Gatto, Gilbert, AZ (US); Jude Miller, Phoenix, AZ (US); Benjamin Dosland Kamrath, Canby, MN (US); Don Mittendorf, Mesa, AZ (US); Jason Smoke, Phoenix, AZ (US); Mark C. Morris, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,724

(22) Filed: Aug. 1, 2019

(65) Prior Publication Data

US 2020/0140983 A1 May 7, 2020

Related U.S. Application Data

(63) Continuation of application No. 15/071,630, filed on Mar. 16, 2016, now Pat. No. 10,385,433.

(51) Int. Cl.
*C22F 1/10* (2006.01)
*F01D 5/28* (2006.01)
(Continued)

(52) U.S. Cl.
CPC .............. *C22F 1/10* (2013.01); *B23P 15/006* (2013.01); *C21D 1/34* (2013.01); *F01D 5/02* (2013.01);
(Continued)

(58) Field of Classification Search
None
See application file for complete search history.

(56) References Cited

U.S. PATENT DOCUMENTS

| H000777 H | 5/1990 | Natarajan |
| 5,312,497 A | 5/1994 | Mathey |
| (Continued) | | |

FOREIGN PATENT DOCUMENTS

| EP | 0352408 A1 | 1/1990 |
| EP | 1609948 A2 | 12/2005 |
| (Continued) | | |

*Primary Examiner* — Brian D Walck
(74) *Attorney, Agent, or Firm* — Lorenz & Kopf, LLP

(57) ABSTRACT

Methods for processing bonded dual alloy rotors are provided. In one embodiment, the method includes obtaining a bonded dual alloy rotor including rotor blades bonded to a hub disk. The rotor blades and hub disk are composed of different alloys. A minimum processing temperature ($T_{DISK\_PROCESS\_MIN}$) for the hub disk and a maximum critical temperature for the rotor blades ($T_{BLADE\_MAX}$) is established such that $T_{BLADE\_MAX}$ is less than $T_{DISK\_PROCESS\_MIN}$. A differential heat treatment process is then performed during which the hub disk is heated to processing temperatures equal to or greater than $T_{DISK\_PROCESS\_MIN}$, while at least a volumetric majority of each of the rotor blades is maintained at temperatures below $T_{BLADE\_MAX}$. Such a targeted differential heat treatment process enables desired metallurgical properties (e.g., precipitate hardening) to be created within the hub disk, while preserving the high temperature properties of the rotor blades and any blade coating present thereon.

16 Claims, 4 Drawing Sheets

(51) Int. Cl.
  *C21D 1/34* (2006.01)
  *F01D 5/02* (2006.01)
  *F04D 29/02* (2006.01)
  *F01D 5/06* (2006.01)
  *B23P 15/00* (2006.01)
  *F04D 29/32* (2006.01)

(52) U.S. Cl.
  CPC .............. *F01D 5/063* (2013.01); *F01D 5/28* (2013.01); *F01D 5/286* (2013.01); *F04D 29/023* (2013.01); *F04D 29/321* (2013.01); *F04D 29/322* (2013.01)

(56) References Cited

U.S. PATENT DOCUMENTS

| | | | |
|---|---|---|---|
| 6,394,793 | B1 | 5/2002 | Bunge |
| 6,478,896 | B1 | 11/2002 | Ganesh et al. |
| 6,660,110 | B1 | 12/2003 | Gayda |
| 7,875,135 | B2 | 1/2011 | Kelly et al. |
| 7,892,370 | B2 | 2/2011 | Ott et al. |
| 8,083,872 | B2 | 12/2011 | Mitchell et al. |
| 8,517,676 | B2 | 8/2013 | Pauli et al. |
| 8,721,812 | B2 | 5/2014 | Furrer et al. |
| 8,813,360 | B2 | 8/2014 | Clark et al. |
| 10,385,433 | B2 * | 8/2019 | Gatto ..................... F01D 5/063 |
| 2007/0044874 | A1 | 3/2007 | Zhang et al. |
| 2008/0271876 | A1 | 11/2008 | Morin |
| 2014/0120483 | A1 | 5/2014 | Trapp et al. |
| 2014/0262198 | A1 | 9/2014 | Bruck et al. |

FOREIGN PATENT DOCUMENTS

| | | |
|---|---|---|
| EP | 1734136 A2 | 12/2006 |
| EP | 2848706 A1 | 3/2015 |
| EP | 3053694 A2 | 8/2016 |

\* cited by examiner

METHODS FOR PROCESSING BONDED DUAL ALLOY ROTORS INCLUDING DIFFERENTIAL HEAT TREATMENT PROCESSES

CROSS-REFERENCE TO RELATED APPLICATION

This application is a continuation application of U.S. patent application Ser. No. 15/071,630, filed Mar. 16, 2016.

STATEMENT REGARDING FEDERALLY SPONSORED RESEARCH OR DEVELOPMENT

This invention was made with Government support under Contract No. W911W6-08-2-0001 awarded by the US Army. The Government has certain rights in the invention.

TECHNICAL FIELD

The present invention relates generally to turbomachine components and, more particularly, to methods for processing a bonded dual alloy rotor during which the rotor is subject to a targeted differential heat treatment process.

BACKGROUND

A Gas Turbine Engine (GTE) can contain different combinations of bladed rotors, such as axial compressor, radial or centrifugal compressor, axial turbine, radial inflow turbine, and fan rotors. During GTE operation, the blades of the rotor are bathed in core gas flow and thus exposed to high temperature, chemically-harsh (e.g., corrosive and oxidative) environments. In contrast, the inner "hub disk" portion of the rotor is largely shielded from core gas flow, but subject to considerable mechanical stress resulting from the centrifugal forces acting on the rotor. Performance benefits can consequently be realized by fabricating the hub disk and rotor blades from different alloys tailored to their unique operating environments. For example, an inserted blade rotor can be produced by attaching bladed pieces composed of a first superalloy to a separately-fabricated hub disk composed of a different superalloy. The bladed pieces are fabricated to include shanks, which are inserted into mating slots provided around the outer rim of the hub disk. Prior to insertion of the blades, the hub disk may be subject to a differential heat treatment process during which the rim of the hub disk is heated, while the inner bore region of the hub disk is cooled relative to the rim. Such a differential heat treatment process promotes grain growth in the rim of the hub disk to increase compliance at the shank-disk interfaces for improved uniformity of load distribution during high speed rotation of the bladed rotor.

While enabling the production of a bladed rotor having blades and a hub disk fabricated from dissimilar alloys, the above-described inserted blade manufacturing approach is associated with multiple disadvantages. Precision machining of the mating shank-disk interfaces can increase the cost and duration of manufacture. If not adequately sealed, the mating shank-disk interfaces can permit undesired leakage across the rotor and potentially trap corrosive debris. As a further drawback, the formation of the shank-disk interfaces may necessitate an increase in the overall size and weight of the bladed rotor to achieve a structural integrity comparable to that of a single piece or monolithic rotor. More recently, manufacturing approaches have been developed for the production of a so-called "bonded dual alloy rotor," such as a dual alloy turbine wheel or compressor wheel. In one approach for producing a bonded dual alloy turbine rotor, a full blade ring is first produced by bonding a number of individually-cast bladed pieces. The full blade ring is then bonded to a separately-fabricated hub disk by diffusion bonding, friction welding, or another bonding process. This yields a rotor having exceptional high temperature properties, a relatively compact and lightweight form factor, low leakage levels, and other desirable characteristics.

While providing multiple advantages over inserted blade rotors, bonded dual alloy rotors and the manufacturing approaches for producing such rotors remain limited in certain respects. For example, and without implying that others in the relevant field have recognized such limitations, the heat treatment processes conventionally performed when producing a bonded dual alloy rotor may fail to adequately create or preserve optimal high temperature properties of the rotor blades, the hub disk, and/or any coating present on the rotor blades. There thus exists an ongoing need for improved dual alloy rotor manufacturing processes, which overcome such limitations to yield a rotor having enhanced performance characteristics (e.g., high temperature capabilities) and a prolonged service lifespan. Such improved rotor manufacturing processes are disclosed herein.

BRIEF SUMMARY

Methods for processing bonded dual alloy rotors are provided. In one embodiment, the method includes obtaining a bonded dual alloy rotor including rotor blades bonded to a hub disk. The rotor blades and hub disk are composed of different alloys. A minimum processing temperature ($T_{DISK\_PROCESS\_MIN}$) for the hub disk and a maximum critical temperature for the rotor blades ($T_{BLADE\_MAX}$) are established such that $T_{BLADE\_MAX}$ is less than $T_{DISK\_PROCESS\_MIN}$. A differential heat treatment process is then performed during which the hub disk is heated to processing temperatures equal to or greater than $T_{DISK\_PROCESS\_MIN}$, while at least a volumetric majority of each of the rotor blades is maintained at temperatures below $T_{BLADE\_MAX}$. Such a targeted differential heat treatment process enables desired metallurgical properties (e.g., precipitate hardening and/or desired residual stress levels) to be created within the hub disk, while preserving the high temperature properties of the rotor blades and any blade coating present thereon. Additional processing steps may then be performed to complete fabrication of the bonded dual alloy rotor.

In another embodiment, the rotor processing method includes obtaining a bonded dual alloy rotor including a blade ring bonded to a hub disk. The blade ring is comprised of rotor blades, which are cast or otherwise produced from a first alloy. The hub disk is powder consolidated, forged, or otherwise produced from a second alloy different than the first alloy. A differential heat treatment process is then performed during which a radially-varied temperature profile is created within the bonded dual alloy rotor. During the different heat treatment process, heat transfer to and from the bonded dual alloy rotor is controlled such that the radially-varied temperature profile increases in temperature when moving in a radially inward direction from the tips of the rotor blades toward the centerline of the bonded dual alloy rotor.

Embodiments of a differential heat treatment process for a bonded dual alloy rotor are further provided. The bonded dual alloy rotor includes a blade ring bonded to a hub disk. The blade ring composed of a first alloy, while the hub disk is composed of a second alloy different than the first alloy.

In an embodiment, the differential heat treatment process includes establishing a minimum processing temperature ($T_{DISK\_PROCESS\_MIN}$) for the hub disk and a maximum critical temperature for the rotor blades ($T_{BLADE\_MAX}$), $T_{BLADE\_MAX}$ less than $T_{DISK\_PROCESS\_MIN}$. A differential heat treatment process is then carried-out during which the hub disk is heated to processing temperatures equal to or greater than $T_{DISK\_PROCESS\_MIN}$, while at least a volumetric majority of each of the rotor blades is maintained at temperatures below $T_{BLADE\_MAX}$.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
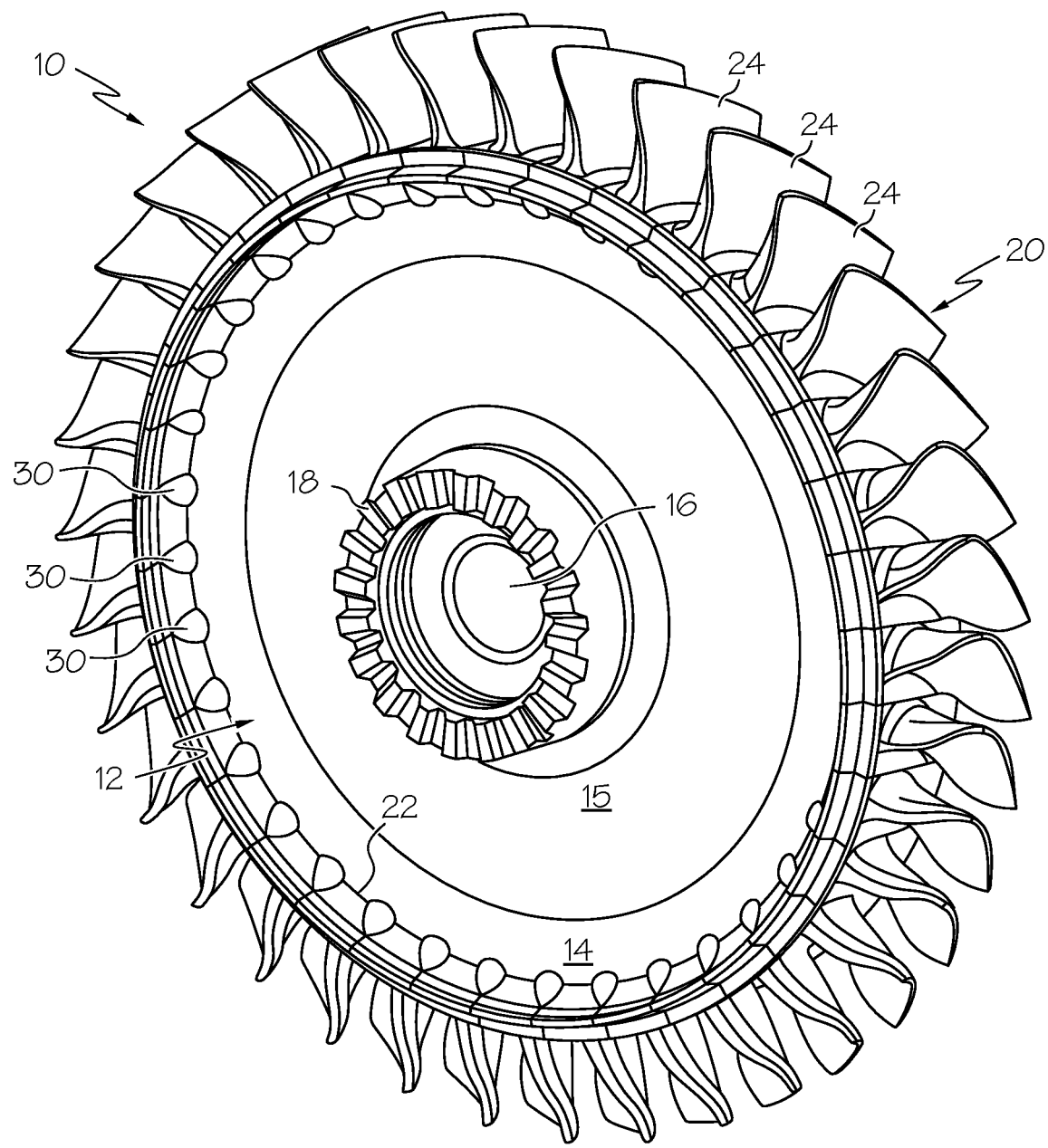
FIG. 1 is an isometric view of a bonded dual alloy rotor and, specifically, a Dual Alloy Turbine (DAT) wheel, which is suitable for inclusion within a gas turbine engine and which is produced or thermally processed in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. The term "processing," as appearing herein, refers to the performance of one or more manufacturing steps involved in the production of a bonded dual alloy rotor.

The following describes embodiments of a method for processing or generally manufacturing a bonded dual alloy rotor, such as a dual alloy turbine wheel or compressor wheel, which is well-suited for usage within Gas Turbine Engines (GTE) or another turbomachine. As briefly described above, existing manufacturing approaches for producing dual alloy rotors are limited as certain technical challenges remain unaddressed or inadequately addressed. A particular technique challenge arises when thermally processing the dual alloy rotor after bonding the rotor blades (e.g., as a full blade ring) to the hub disk, whether for the purpose of precipitate hardening the hub disk material, for the purpose of providing stress relief within the hub disk, or to otherwise refine the metallurgical properties of the hub disk material. During such post-bonding heat treatment, the hub disk may be heated to highly elevated processing temperatures, which can degrade the metallurgical properties of the rotor blades and potentially reduce the effectiveness any coating formed on the blade surfaces. Possible detrimental effects that may occur due to over-temperature exposure of the rotor blades include over-aging of the blade material and a corresponding reduction in blade strength. Additionally, in embodiments wherein the rotor blades are coated, such high temperature exposure can cause excessive diffusion of the blade coating into the blade material, which may reduce the effectiveness of the coating and can embrittle or otherwise weaken the rotor blade material. Still further undesired outcomes of over-temperature exposure can include rafting of precipitates, undesired grain growth, melting of the blade coating (if present), and a reduction in the desired residual stresses within a particular feature or region of the bonded dual alloy rotor.

The manufacturing methods described herein overcome the above-noted limitations through the performance of a highly targeted, post-bonding differential heat treatment process. Prior to the differential heat treatment process, a minimum processing temperature ($T_{DISK\_PROCESS\_MIN}$) for the hub disk and a maximum critical temperature for the rotor blades ($T_{BLADE\_MAX}$) are established. $T_{DISK\_PROCESS\_MIN}$ can be established based upon the purpose of the heat treatment process (e.g., for precipitate hardening of the hub disk, for stress relief within the hub disk, etc.) and any number of additional factors, such as hub disk composition and the hub disk geometry at the time of heat treatment (which will typically be larger in volume than the final desired hub disk geometry later defined through machining). $T_{BLADE\_MAX}$ is similarly established based upon the physical characteristics of the rotor blades, blade material, the composition of any coating present on the blade surfaces, whether it is desired to diffuse the coating material (if present) further into the blades, and other such factors. The differential heat treatment process is then performed for the bonded dual alloy rotor during which the hub disk is heated to processing temperatures equal to or greater than $T_{DISK\_PROCESS\_MIN}$, while at least a volumetric majority of each of the rotor blades is maintained at temperatures below $T_{BLADE\_MAX}$. In this manner, the metallurgical properties of the rotor blades can be maintained through the heat treatment process, as can the integrity of any coating present on the rotor blades. A bonded dual alloy rotor can thus be produced having optimized high temperature capabilities and a prolonged operational lifespan. This is highly desirable.

An exemplary process for manufacturing a dual alloy bladed rotor is described below in conjunction with FIGS. 3-4. For purposes of explanation, the following describes the exemplary manufacturing process in conjunction with the manufacture of a particular type of bladed rotor; specifically, a Dual Alloy Turbine (DAT) rotor or wheel initially described below in conjunction with FIGS. 1-2. As a point of emphasis, the following description is provided by way of non-limiting example only. In further embodiments, the below-described manufacturing process can be utilized to produce other types of bladed rotors including a plurality of blades or airfoils bonded to an inner body or hub disk. In many cases, the plurality of blades is first inter-bonded (e.g., metallurgically consolidated) into a blade ring, which is then diffusion bonded, friction welded, or otherwise joined to a hub disk. A non-exhaustive list of other rotors that can be produced utilizing embodiments of the below-described manufacturing process includes other types of radial turbine wheels, axial turbine wheels, axial compressor wheels, radial or centrifugal compressor wheels (also referred to as "impellers"), and fan rotors. More generally, the dual alloy bladed rotors described herein can be utilized within any type of GTE or turbomachine, regardless of application or design.

FIG. 1 is an isometric view of a DAT wheel 10 produced in accordance with an exemplary embodiment of the present invention. DAT wheel 10 is an axial turbine rotor in this example, but may assume other forms (e.g. that of a radial inflow turbine rotor) in further embodiments. DAT wheel 10 contains an inner body or "hub disk" 12, which has a substantially cylindrical or disk-shaped geometry. Hub disk 12 includes an outer annular portion 14 and an inner portion 15 through which a central channel or axial bore 16 extends. Axial bore 16 is sized and shaped to permit the passage of one or more shafts when DAT wheel 10 is installed within a particular GTE. Hub disk 12 may also include a castellated or toothed tubular protrusion 18 to further facilitate installation of DAT wheel 10 within a GTE platform. Toothed tubular protrusion 18 may interlock or mate with a corresponding castellated or toothed member fixedly coupled to a GTE shaft, which enables torque transmission to and from DAT wheel 10. DAT wheel 10 further includes a rotational axis or centerline 19, which is coaxial with bore 16 and which is identified in FIG. 4 (described below).

Figure 2:
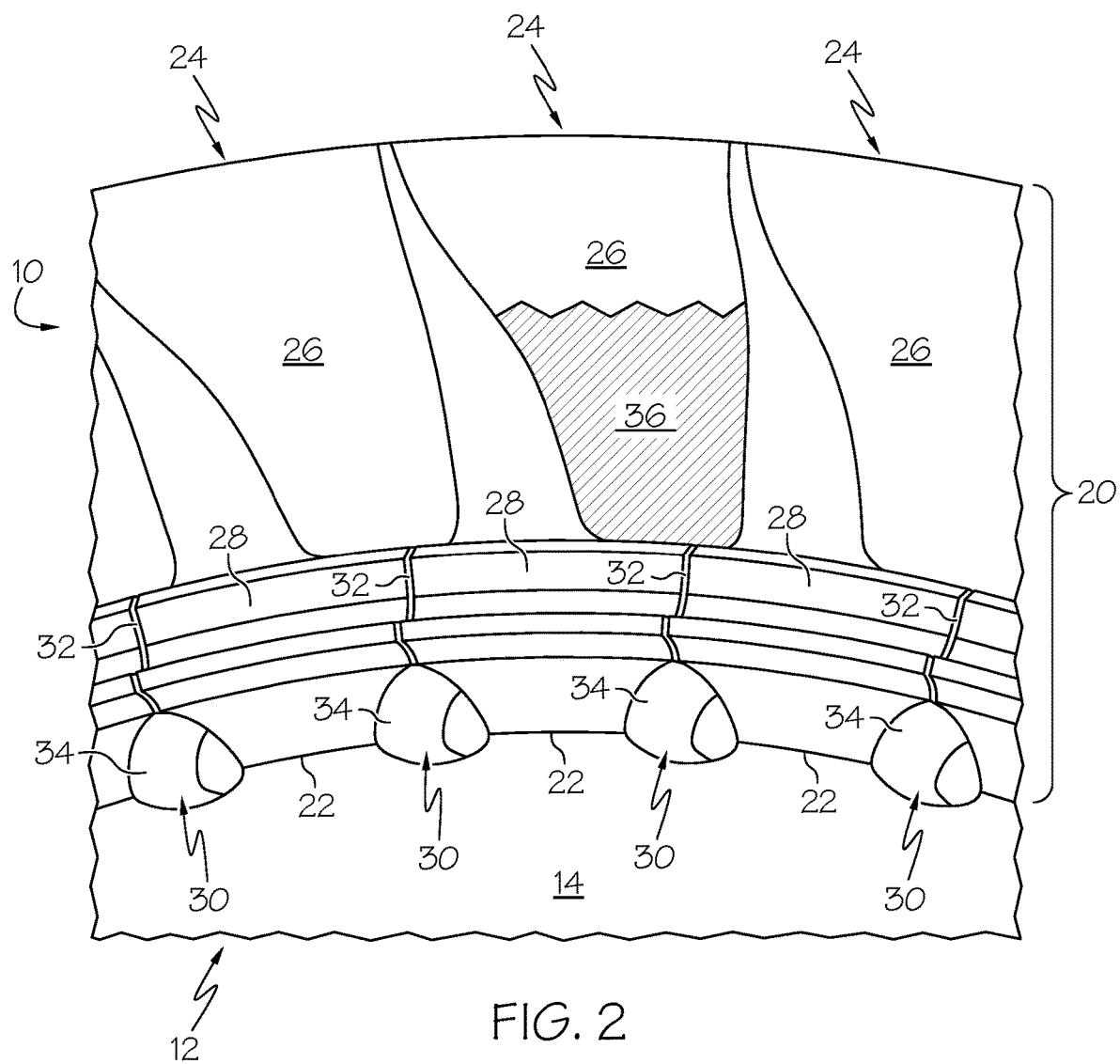
FIG. 2 is an isometric view of a portion of the exemplary DAT wheel shown in FIG. 1 illustrating, in greater detail, certain features of the DAT wheel, such as the hub disk, the blade ring, and the annular bond line along which the blade ring is bonded to the hub disk.

A blade ring 20 is positioned around and bonded to outer annular portion 14 of hub disk 12 along an annular bond line 22. Blade ring 20 is comprised of a series of blade structures 24, only a few of which are labeled in FIG. 1 to avoid cluttering the drawing. Three such blade structures 24 are illustrated in greater detail in FIG. 2. Referring jointly to FIGS. 1-2, blade structures 24 are angularly spaced about the outer circumference of hub disk 12 and, thus, about the rotational axis of DAT wheel 10 at substantially regular intervals; e.g., in the illustrated example wherein DAT wheel 10 includes thirty six structures 24, blade structures 24 may be circumferentially spaced about the hub disk 12 at 10° intervals. As identified in FIG. 2, each blade structure 24 includes an airfoil or blade 26 and an enlarged base portion 28 (referred to herein as "shank 28"). Each blade 26 extends radially from its respective shank 28 and may be integrally formed therewith as a single piece by, for example, casting and machining. The inner radial surface or bottom of each shank 28 is bonded to the outer circumferential surface of hub disk 12 along annular bond line 22. In an embodiment, shanks 28 are bonded to hub disk 12 utilizing a hot isostatic bonding ("HIP") diffusion process, as described more fully below in conjunction with STEP 42 of exemplary method 40 (FIG. 3). While blade ring 20 is bonded directly to the outer annular portion 14 of hub disk 12 in the illustrated example, this need not always be the case. Instead, in further embodiments, an intervening structure or layer (e.g., an additively-built transition ring) may be provided between the inner circumference of blade ring 20 and the outer circumference of hub disk 12.

DAT wheel 10 can be fabricated to further include a plurality of strain relief features, such as a series of inter-blade cut-outs 30. As shown most clearly in FIG. 2, each inter-blade cut-out 30 includes a radial slit 32, which is formed between two neighboring shanks 28. Slits 32 are formed within DAT wheel 10 to ease hoop stress within wheel 10 when subject to pronounced temperature gradients during engine operation. Radial slits 32 terminate in enlarged openings 34, which are formed through wheel 10 and imparted with substantially rounded (e.g., circular, elliptical, tear-shaped, etc.) geometries. Openings 34 are provided to distribute mechanical stressors more uniformly over a large surface area to reduce stress concentrations within DAT wheel 10. In further embodiments, DAT wheel 10 may lack inter-blade cut-outs 30 or may include different strain relief features.

Blade structures 24 and, therefore, blades 26 are fabricated from a first alloy (the "blade alloy"). The blade alloy can be a single crystal, directionally-solidified, or equiaxed nickel-based superalloy in both internally cooled and uncooled blade embodiments. In contrast, hub disk 12 is fabricated from a second alloy (the "hub alloy") different than the first alloy, such as a consolidated powder metal or extruded superalloy. As further indicated in FIG. 2, a blade coating 36 may be formed over selected outer surfaces of blades 26. Blade coating 36 is only partially shown in FIG. 2 for a single blade (the central blade shown in the drawing figure) to emphasize that blade coating 36 need not be present in all embodiments. Blade coating 36 can be deposited as a single layer of material, which is then diffused into the parent material of blades 26. Alternatively, blade coating 36 can be a multi-layer coating system, which is applied to blades 26 for thermal barrier protection, for environmental barrier protection, or for another purpose. The term "blade coating," then, is generally utilized herein to encompass both single layer coatings and multi-layer coating systems. In one embodiment, blade coating 36 is an aluminum-based coating, which has been diffused into blades 26 to form aluminides with the blade material. Additionally, when DAT wheel 10 is desirably operated at exceptionally high temperatures, additional coating materials may also be deposited in conjunction with aluminum, such as platinum. The available aluminum may then oxidize in the GTE environment to form an oxidation resistant alumina layer. While this is advantageous, excessive diffusion of the aluminum (or other coating materials) into the blade material can structurally weaken blades 26.

Due to its bonded dual alloy construction, DAT wheel 10 provides enhanced high temperature properties, a relatively compact and lightweight form factor, low leakage levels, and other desirable characteristics. A difficulty arises, however, when heat treating (e.g., precipitate hardening) hub disk 12 after bonding blade ring 20 thereto. Specifically, and as previously indicated, heat treatment of hub disk 12 may entail exposure to elevated temperatures (e.g., for solutionizing purposes) at which the properties of blade ring 20 and/or blade coating 36 can potentially degrade. With respect to blade coating 36, in particular, excessive thermal exposure may result in over-diffusion of the coating material into the blade alloy and/or may cause melting of the coating material, which may render coating 36 less effective and potentially reduce the mechanical strength of the blade material. In conventional manufacturing approaches, the degradation in the properties of blade ring 20 and blade coating 36 may have been accepted as an unavoidable penalty. Alternatively, rotor blades 26 may have simply been left uncoated. In the case of DAT wheel 10, however, such a penalty is lessened if not entirely avoided through the performance of a highly targeted differential heat treatment process. An example of such a differential heat treatment process will now be described in the context of an exemplary rotor manufacturing process set-forth in FIG. 3.

Figure 3:
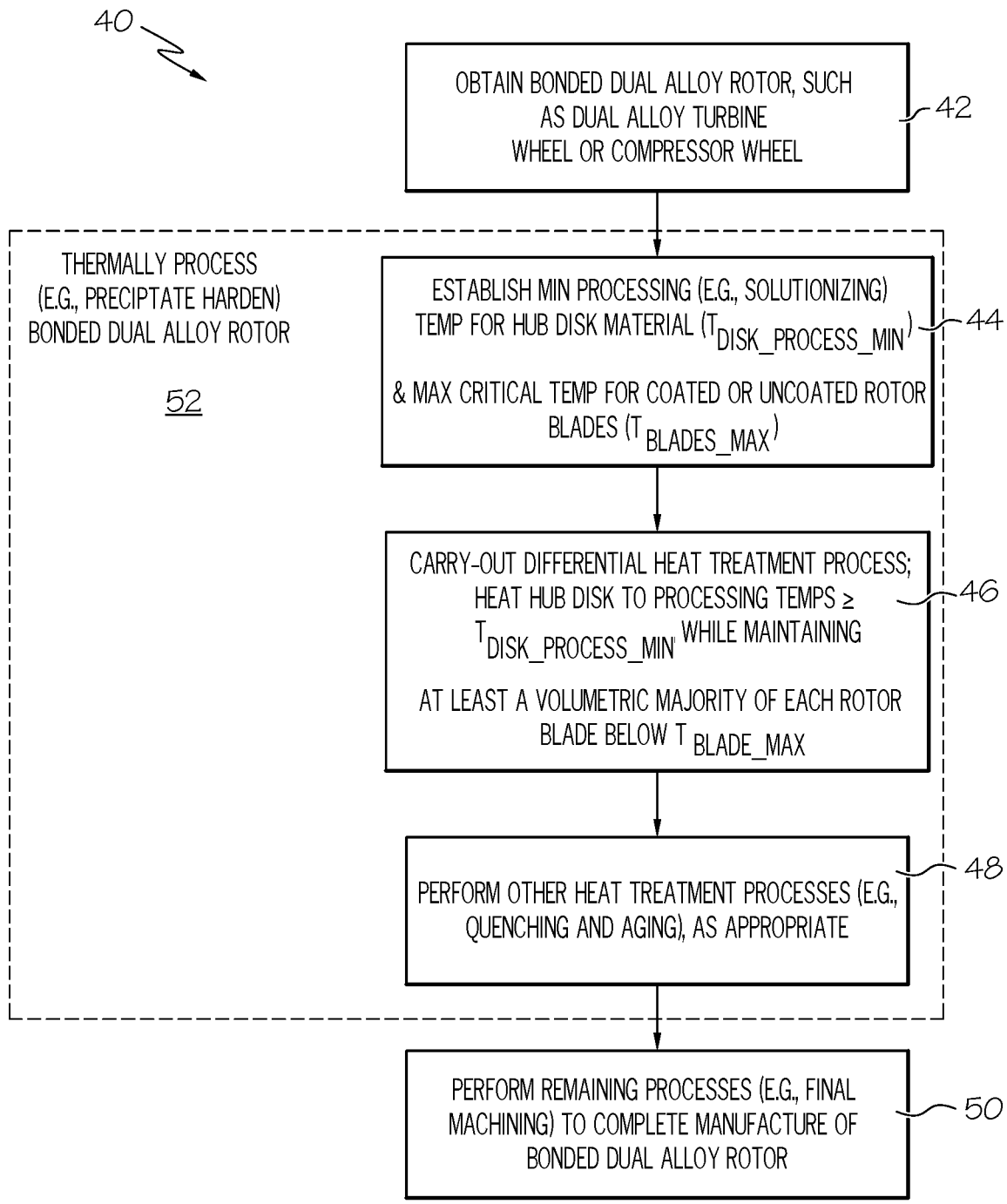
FIG. 3 is a flowchart setting-forth an exemplary manufacturing method for producing a bonded dual alloy rotor, such as the DAT wheel shown in FIGS. 1-2, during which the rotor is subjected to a targeted differential heat treatment process.

FIG. 3 is a flowchart setting-forth an exemplary method 40 for manufacturing a bonded dual alloy rotor, as illustrated in accordance with an exemplary embodiment of the present invention. For convenience of explanation, exemplary method 40 is primarily described below in conjunction with the fabrication of DAT wheel 10 shown in FIGS. 1-2. This notwithstanding, it is emphasized that exemplary method 40 can be utilized to produce various other types of turbine rotors (e.g., radial inflow DAT wheels) and other types of dual alloy rotors (e.g., axial compressor wheels, impellers, and fan rotors), whether such rotors are ultimately utilized within a GTE, another turbomachine (e.g., a supercharger), or a different platform or application. Exemplary method 40 includes a number of STEPS 42, 44, 46, 48, and 50, with STEPS 44, 46, and 48 performed as part of a larger PROCESS BLOCK 52. Depending upon the particular manner in which method 40 is implemented, each step generically illustrated in FIG. 3 may entail a single process or multiple individual sub-processes. Furthermore, the steps illustrated in FIG. 3 and described below are provided by way of non-limiting example only. In alternative embodiments of method 40, additional steps may be performed, certain steps may be omitted, and/or the illustrated steps may be performed in alternative sequences.

Referring collectively to FIGS. 1-3, manufacturing method 40 commences with STEP 42 (FIG. 3) during which a bonded dual alloy rotor is obtained in an uncompleted or partially-fabricated state. As appearing herein, the term "obtaining" encompasses purchase of bonded dual alloy rotor from a third party supplier, independent fabrication of the rotor, and any other method in which the rotor can be acquired in a partially-completed state. The bonded dual alloy rotor obtained during STEP 42 of method 40 can presently exist at any stage of completion, providing that the rotor includes rotor blades bonded to a hub disk. For example, the bonded dual alloy rotor may be obtained in a near-completed during STEP 42 state pending only additional thermal processing (as described below in conjunction with PROCESS BLOCK 52), final machining (as described below in conjunction with STEP 50), and possibly other relatively minor processing steps.

The particular construction and composition of the partially-completed bonded dual alloy rotor, as initially produced or otherwise obtained during STEP 42 of method 40 (FIG. 3), will vary amongst embodiments. The fabrication method utilized to produce the bonded dual alloy rotor leading into STEP 42 of method 40 will also vary amongst embodiments. However, to provide an exemplary and non-limiting context, the bonded dual alloy rotor may be produced as follows in one implementation of method 40. First, a series of individual bladed pieces is cast from a chosen superalloy. The bladed pieces may or may not be cast to include internal cooling features, and machining can be performed after casting, as needed. The bladed pieces are advantageously cast or otherwise produced from a superalloy having a relatively high mechanical strength under high temperature conditions. In one embodiment, each bladed piece is cast or otherwise produced from a single crystal or directionally-solidified superalloy having its crystallographic grain structure oriented to provide optimal mechanical strength in a radial direction. A creep-resistant, single crystal, nickel-based superalloy may be utilized, such as the nickel-based superalloys commercially identified as "CMSX 3," "CMSX 4," "SC180," and "1484," to list but a few examples. In further embodiments, the bladed pieces can be fabricated in other manners and fabricated from other high temperature materials, such as equiaxed superalloys.

The bladed pieces are next arranged in a ring formation or annular grouping and inter-bonded to yield a bonded blade ring. In certain embodiments, a directed thermal growth process can be utilized to produce the bonded blade ring via diffusion bonding. In other embodiments, an additive metal deposition process can be utilized to build-up joints between neighboring bladed pieces and/or a bonding ring around the inner circumferential surface of the ring formation. A HIP process may then be carried-out to bond the resulting blade ring to a separately-fabricated hub disk. During the HIP process, a hermetic cavity or enclosure may be formed to enclose the interfaces formed between the blade ring and the hub disk. The blade ring and the hub disk may then be exposed to elevated temperatures and pressures external to the hermetic cavity sufficient to diffusion bond the shank-to-shank bonding interfaces and the shank-to-hub bonding interface. The hub disk is desirably produced from a superalloy having enhanced mechanical strength properties (e.g., high stress rupture strength and fatigue resistance) at lower operational temperatures (relative to the temperatures to which the rotor blades are exposed). As a first example, the hub disk may be produced by powder metallurgy and, specifically, by HIP consolidation of a superalloy powder satisfying these criteria. Alternatively, and as a second example, the hub disk may be produced from an extruded, wrought material. The hub disk may be fabricated to have a near net shape, which encompasses the final volume of the hub disk and which is enlarged in certain regions for handling and heat treatment purposes.

A coating may or may not be applied over the blades and other portions of the blade ring of the bonded dual alloy rotor, such as the rotor rim and the blade platform regions. When present, the blade coating can be applied after casting the individual bladed pieces and prior to consolidation into the blade ring. Alternatively, the blade coating can be applied after bonding of the blade ring to the hub disk and either prior to or after the below-described differential heat treatment process. Suitable processes for producing the blade coating include, but are not limited to, plasma spray, pack cementation, electroplating, and vapor deposition techniques. The number of layers and the formulation of the blade coating (when present) will vary amongst embodiments. In one embodiment, an aluminum-based coating, such as a platinum-aluminide coating (e.g., coating 36 shown in FIG. 2), may be deposited or otherwise formed on the blade surfaces. One or more diffusion steps can be performed after formation of the blade coating to diffuse the aluminum (and any other coating materials) into the rotor blades. Furthermore, in certain implementations, the below-described differential heat treatment process carried-out during STEP 48 of method 40 may also be leveraged to initially diffuse or to further diffuse the blade coating material into the coated regions of the rotor blades and blade ring, as desired.

Exemplary method 40 next advances to PROCESS BLOCK 52 during which the bonded dual alloy rotor is thermally processed. Thermal processing of the bonded dual alloy rotor can entail any process or series of processes including at least one differential heat treatment step, such as that described below in conjunction with STEP 46 of method 40. In one implementation, a precipitate hardening process is carried-out during PROCESS BLOCK 52. In this case, and as described more fully below, a solutionizing heat treatment process may be carried-out during STEP 46 of PROCESS BLOCK 52 followed by one or more additional heat treatment processes (e.g., quenching and aging) carried-out during STEP 48 of method 40. In further embodiments, various other heat treatment processes can be carried-out during PROCESS BLOCK 52 in addition to or in lieu of precipitate hardening, providing that at least one differential heat treatment process is performed during which the hub disk is heated to elevated processing temperatures from which the rotor blades and/or any rotor blade coating are desirably shielded.

With continued reference to FIG. 3, PROCESS BLOCK 52 commences with STEP 44 during which two key process parameters are established: (i) a minimum processing temperature of the hub disk (hereafter "$T_{DISK\_PROCESS\_MIN}$"), and (ii) a maximum critical temperature of the rotor blades (hereafter "$T_{BLADE\_MAX}$"). Addressing first $T_{DISK\_PROCESS\_MIN}$, this process parameter can be established based upon the purpose of the differential heat treatment process performed during STEP 46, the hub disk composition, the hub disk geometry at the time of heat treatment, and other such factors. In embodiments wherein the differential heat treatment process is performed for the purpose of hub disk solutionizing, $T_{DISK\_PROCESS\_MIN}$ may or may not exceed the solvus temperature of the hub disk alloy. In one embodiment, and by way of non-limiting example only, $T_{DISK\_SOLUTION}$ selected to range from about 2000 to about 2200 degrees Fahrenheit (° F.) or from about 1093 to about 1204 degrees Celsius (° C.). In other embodiments, $T_{DISK\_PROCESS\_MIN}$ can be greater than or less than the aforementioned range.

Addressing next the maximum critical temperature of the rotor blades, $T_{BLADE\_MAX}$ represents a temperature threshold above which heating of the rotor blades may alter the microstructure of the blades in a manner detracting from the high temperature properties thereof and/or compromise the integrity of any coating present on the blade surfaces. Accordingly, $T_{BLADE\_MAX}$ can be established based upon the physical characteristics of the rotor blades, blade material, the composition of any coating present on the blade surfaces, whether it is desired to diffuse the coating material (if present) further into the blades, and other such factors. In one embodiment wherein $T_{DISK\_SOLUTION}$ falls within the aforementioned temperature range, $T_{BLADE\_MAX}$ is selected to be less than $T_{DISK\_SOLUTION}$, while ranging between 1900 and 2100° F. (~1038 to ~1149° C.).

Advancing next to STEP 46 of method 40 (FIG. 3), the differential heat treatment process is performed. During this step, the hub disk (e.g., hub disk 12) is heated to processing temperatures equal to or exceeding $T_{DISK\_SOLUTION}$, while at least volumetric majority and, perhaps, the substantial entirety of the rotor blades (e.g., rotor blades 26) is maintained below $T_{BLADE\_MAX}$. Convective and radiative heat exchange with the bonded dual alloy rotor is regulated to create a desired heating distribution or thermal profile within the rotor (referred to hereafter as a "radially-varied temperature profile"). Additionally, processing conditions are usefully controlled such that heat differentials within the hub disk itself are minimized, while the thermal gradient is largely concentrated at or adjacent the bond line between the hub disk and the blade ring (e.g., bond line 22). This may be accomplished by applying varying heat loads to targeted regions of the bonded dual alloy rotor, while simultaneously thermally insulating and/or cooling the blade ring (e.g., blade ring 20), as described more fully below.

During STEP 46 of method 40 (FIG. 3), an optimized thermal distribution or profile is created within the bonded dual alloy rotor. The optimized thermal distribution or profile is established to achieve the desired heat treatment of the hub disk of the bonded dual alloy rotor, while further minimizing deleterious effects to the blade microstructure and/or any blade coating present on the rotor blades. Any combination of active heating, active cooling, and passive cooling can be employed to create the desired thermal distribution within the bonded dual alloy rotor. With respect to active heating, in particular, any technique suitable for imparting controlled heat loads to selected regions of the bonded dual alloy rotor can be utilized. A non-exhaustive list of active heating techniques includes inductance heating, directed radiative heating utilizing a susceptor or similar device, and directing heated jets or flames to specific regions of the rotor utilizing, for example, oven gas heating. When employed, active cooling can include the circulation of a cooling gas at strategic locations within the thermal processing chamber or actively impinging such a coolant gas on the rim, platform, and/or blade surfaces of the bonded dual alloy rotor. Finally, passive cooling can be accomplished by controlling radiative heat transfer to and from the bonded dual alloy rotor through, for example, adjustments in oven or furnace wall temperatures, altering radiation shield temperatures and view factors, and/or by employing thermal insulation materials to cover certain regions of the rotor, such as selected portions of the blade ring.

Figure 4:
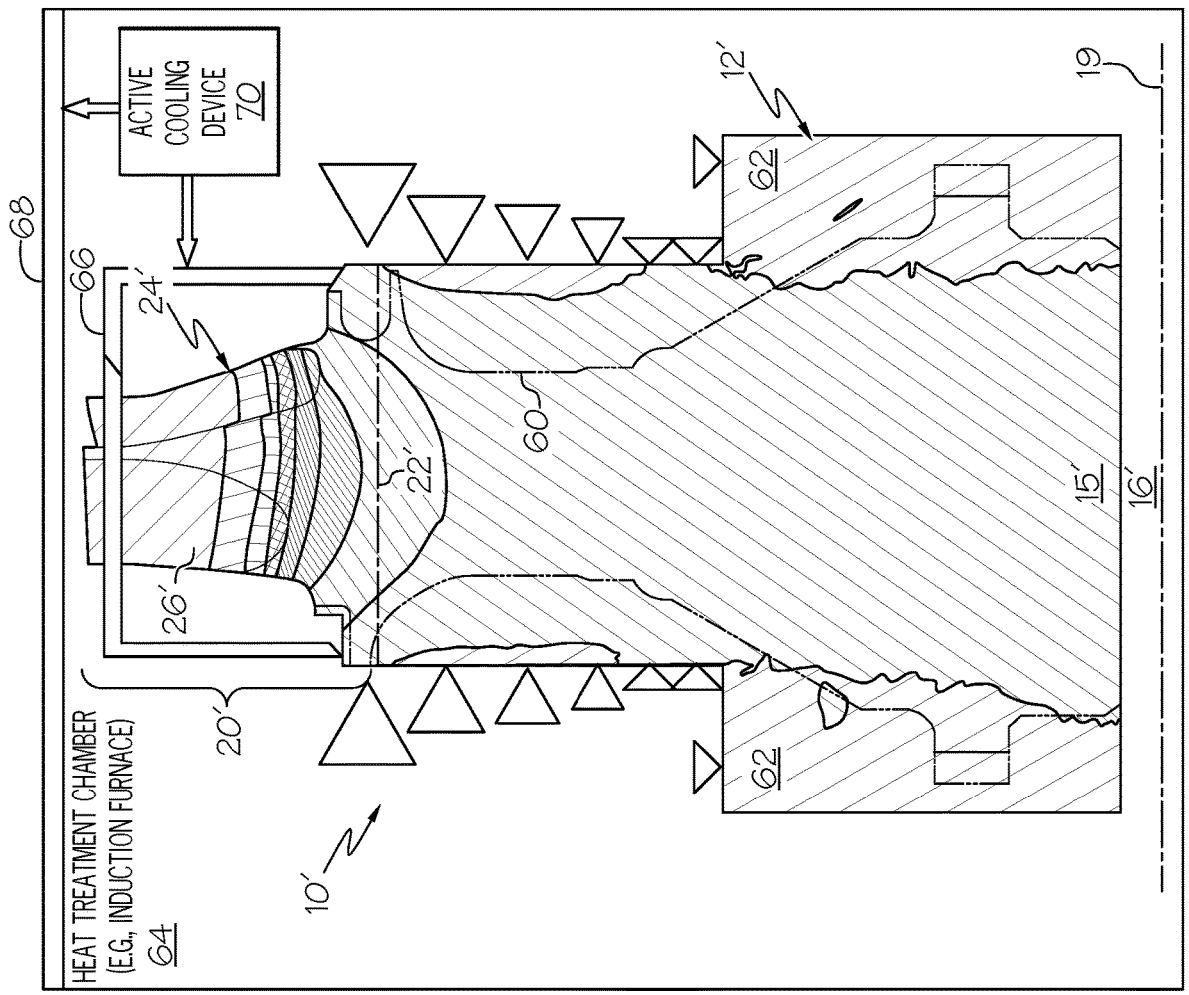
FIG. 4 is a cross-sectional view of a portion of the DAT wheel shown in FIGS. 1-2, as schematically illustrated during the performance of a differential heat treatment process that may be carried-out during the manufacturing method of FIG. 3 in one exemplary and non-limiting implementation thereof.
Figure 4:
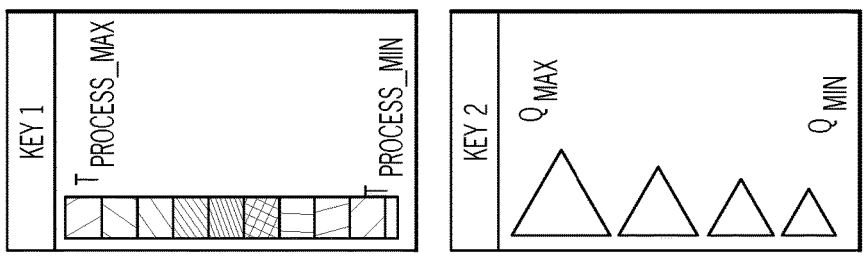

FIG. 4 is a cross-sectional view of a portion of DAT wheel 10 illustrated during an exemplary differential heat treatment process, which can be carried-out during STEP 46 of method 40 (FIG. 3) and which is carried-out in a heat treatment chamber 64. The DAT wheel shown in FIG. 4 generally corresponds to DAT wheel 10 described above in conjunction FIGS. 1-2; thus like reference numerals have been utilized to denote like structural elements, but with the addition of a prime (') symbol to indicate that wheel 10' remains in a partially-completed state at this juncture of manufacture. Specifically, at the stage of manufacture shown in FIG. 4, a relatively large portion of hub disk 12' and a smaller portion of blade ring 20' have not been fully machined to their respective final geometries. The profile of the inner "final geometry" portion of hub disk 12' is indicated by phantom line 60, while the outer sacrificial portions of hub disk 12' are identified by reference numerals 62. Additionally, slits 32 and openings 34 (shown in FIGS. 1-2) have not yet been machined into DAT wheel 10'.

As indicated above, heat transfer to and from DAT wheel 10' is controlled during the differential heat treatment process to develop a desired radially-varied temperature profile within wheel 10'. This may be more appreciated by referring to FIG. 4 wherein disparate temperature regions are represented by different cross-hatching patterns identified in KEY 1. As can be seen in FIG. 4, a temperature profile ranges from a maximum temperature $T_{PROCESS\_MAX}$ to a minimum temperature $T_{PROCESS\_MIN}$. The values of $T_{PROCESS\_MAX}$ and $T_{PROCESS\_MIN}$ will vary amongst embodiments. However, $T_{PROCESS\_MAX}$ will typically be greater than $T_{DISK\_PROCESS\_MIN}$, while $T_{PROCESS\_MIN}$ will be less than $T_{BLADE\_MAX}$. The temperature profile shown in FIG. 4 is induced in DAT wheel 10' over a peak heating period; that is, the period over which a maximum cumulative heat load is applied to and the greatest processing temperatures occur within DAT wheel 10'. The temperature profile within DAT wheel 10' may vary during other phases of the heating schedule, such as during a ramp-up period, a cool-down period, and any thermal soak periods. As described more fully below, hub disk 12' is heated to processing temperatures equal to or greater than $T_{DISK\_PROCESS\_MIN}$ over a peak heating period of STEP 46, while heat transfer to and from the DAT wheel 10' is controlled such that the average temperature of the wheel 10' outboard of annular bond line 22' is less than the average temperature of wheel 10' inboard of bond line 22' over the peak heating period.

During the differential heat treatment process, a first temperature controlled zone may be created within DAT wheel 10' extending from the tips of rotor blades 26' to annular bond line 22'. Additionally, a second temperature controlled zone may be further created within DAT wheel 10' extending from bond line 22' to the innermost portion (e.g., inner bore portion 15') of hub disk 12'. As the radially-varied temperature profile increases when moving radially inward from the blade tips toward centerline 19, the average temperature within the first temperature zone (outboard of bond line 22') will be less than the average temperature within the second temperature zone (inboard of bond line 22'). The temperature profile within DAT wheel 10' does not increase in a linear fashion, but rather increases rapidly when moving radially inward from the blade tips toward annular bond line 22' and then increases less rapidly (if at all) when moving radially inward from bond line 22' toward centerline 19 of DAT wheel 10'. This allows the radial temperature gradient to be concentrated in a fairly narrow band containing or located radially adjacent bond line 22', while simultaneously imparting the thermal gradient with a relatively broad temperature range (the difference between $T_{PROCESS\_MIN}$ and $T_{PROCESS\_MAX}$). Such a highly concentrated radial temperature gradient, which encompasses or is located adjacent bond line 22', enables blade ring 20' and hub disk 12' to be exposed to markedly different temperatures during the heat treatment process. This, in turn, allows the heat treatment process to be tailored for optimal treatment of blade ring alloy, the hub disk alloy, and any coating present on the blade surfaces.

In the above-described manner, a radially-varied temperature profile is created within DAT wheel 10' during heat treatment, with the temperature profile increasing in a non-linear manner when moving from the blade tips toward centerline 19. Additionally, as previously noted, heat transfer to and from DAT wheel 10' is controlled such that the radially-varied temperature profile increases at a first rate when moving radially inward from the blade tips toward annular bond line 22' and at a second, lower rate when moving radially inward from bond line 22' toward centerline 19. The radially-varied temperature profile created within DAT wheel 10' may also be described as having a median temperature zone located within blade ring 20' and rotor blades 24'. As generally shown in FIG. 4 by the different cross-hatched regions, the median temperature zone (that is, the temperature zone having a temperature midway between the maximum and minimum temperatures of the radially-varied temperature profile) may be located within rotor blades 24' within or adjacent the base portions of blades. Furthermore, in the illustrated embodiment, the median temperature zone is located closer to annular bond line 22' than to the tips of rotor blades 26'.

While it is desired to create a fairly pronounced thermal gradient within DAT wheel 10' such that blade ring 20' and hub disk 12' are subject to markedly different temperatures during thermal processing, it may also be desirable to create a relatively uniform temperature profile within final geometry portion 60 of hub disk 12' itself. Hub disk 12' may thus be heated to processing temperatures equal to or greater than $T_{DISK\_PROCESS\_MIN}$ over the peak heating period, while the heat transfer to and from DAT wheel 10' may be controlled such the magnitude of any temperature gradient occurring within hub disk 12' over the peak heating period is less than the difference between $T_{DISK\_PROCESS\_MIN}$ and $T_{BLADE\_MAX}$. Furthermore, to provide substantially even heating through hub disk 12', hub disk 12' may be imparted with an enlarged heat treatment shape, which is optimized to provide the appropriate peak temperatures in the final machined part (e.g., DAT wheel 10' as shown in FIGS. 1-2).

Disparate heat loads can be applied to different targeted regions of DAT wheel 10', as appropriate, to create a desired radial and axial thermal distribution within wheel 10' during the differential heat treatment process performed during STEP 46 (FIG. 3). With respect to the embodiment shown in FIG. 4, specifically, this is indicated by triangular symbols of varying sizes wherein increasingly larger triangular symbols denote greater heat loads or flux inputs, as indicated by KEY 2. During the heat treatment process, controlled heat loads are applied to DAT wheel 10' at targeted locations between a lower portion of blade ring 20' and the wider portion of the hub disk 12'. As can be seen, the heat loads applied to DAT wheel 10' are controlled to generally decrease in magnitude when moving radially inward from bond line 22' toward centerline 19. In this regard, a first heat load may be applied to a first region of wheel 10', while a second, lesser heat load is concurrently or simultaneously applied to a second region of wheel 10' radially inboard of the first region. Similarly, a maximum heat load may be applied to DAT wheel 10' at a first location proximate or radially adjacent annular bond line 22', while a minimum heat load is applied to wheel 10' at a second location radially inboard of the first location.

During the heat treatment process, varying heat loads may be applied to different regions of the forward or leading face of DAT wheel 10' (located on the left side of FIG. 4) in accordance with a first heat treatment pattern. Concurrently, varying heat loads may be applied to different regions of the aft or trailing face of wheel 10' (located on the right side of FIG. 4) in accordance with a second heat treatment pattern. The first and second heat treatment patterns may or may not be substantially identical. In the illustrated example, DAT wheel 10' is generally bilaterally symmetrical as taken along a fore-aft axis; that is, wheel 10' is substantially symmetrical relative to a plane orthogonal to centerline 19 and passing through the center of wheel 10'. Accordingly, the heat load distribution applied to the forward face of DAT wheel 10' may substantially mirror or match the heat load distribution applied to the aft face of wheel 10'. In further embodiments, DAT wheel 10' may not be bilaterally symmetrical along the fore-aft axis. In such embodiments, the thermal flux pattern or heat load distribution applied to the forward face of DAT wheel 10' may differ relative to the heat load distribution applied to the aft face of wheel 10'. Generally, then, it should be understood that different heat load distributions can be applied to the forward face of DAT wheel 10', to the aft face of wheel 10', and/or to any other portion of wheel 10', as appropriately tailored to create a desired thermal distribution within heat treated wheel 10' (particularly, within final part geometry 60 of wheel 10') through the heat treatment process.

The disparate heat loads applied to DAT wheel 10' during STEP 46 of method 40 (FIG. 3) can be controlled in various different manners. Such manners may include the usage of inductance heating, through directed radiation utilizing a susceptor, or by contacting targeted regions of wheel 10' with heated jets, flames, or the like. In one embodiment, the different heat loads are created by placing different induction coils adjacent different targeted regions of the dual alloy rotor and then controlling the coils to induce the different heat loads. In this regard, DAT wheel 10' may be placed in an induction furnace 64 containing at least first and second induction coils, which are then energized or otherwise controlled to induce disparate heat loads in different regions of DAT wheel 10'; e.g., the first induction coil may be controlled to induce the first heat load in the first region of DAT wheel 10' mentioned above, while the second induction coil is controlled to induce the second, lesser heat load in the second region of wheel 10' previously mentioned.

As noted above, DAT wheel 10' can be obtained in an enlarged heat treatment form including outer sacrificial portions 62 and an inner final geometry portion 60. The temperature exposure of outer sacrificial portions 62 during the heat treatment process are of lesser concern as portions 62 are ultimately machined away or otherwise removed. The differential heat treatment process performed during 46 of method 40 (FIG. 3) may further entail controlling heat transfer to and from the bonded dual alloy rotor during the differential heat treatment process such that the average temperature of outer sacrificial portion 62 of hub disk 12' is greater than the average temperature of inner final geometry portion 60 over the peak heating period. This is generally shown in FIG. 4 wherein it can be seen that the zones of DAT wheel 10' heated to the maximum processing temperatures ($T_{PROCESS\_MAX}$) are largely confined to outer sacrificial portion 62 of hub disk 12', while the inner portion of hub disk 12' encompassing the bulk of final geometry portion 60 is heated to an average temperature less than $T_{PROCESS\_MAX}$.

As previously noted, the temperature profile of the bonded dual alloy rotor can also be controlled through the usage of passive cooling, active cooling, and/or selective thermal insulation during the differential heat treatment process. Specifically, a heat load may be applied to hub disk 12', while at least a portion of rotor blades 26' are thermally insulated. Consider further FIG. 4 illustrating a specialized thermal insulation structure 66, which may be positioned around DAT wheel 10'. Specifically, thermal insulation structure may be positioned around blade ring 20' to enclose at least a volumetric majority and, perhaps, the substantial entirety of rotor blades 26'. Thermal insulation structure 66 may have a clamshell-type design and register to the outer rim of blade ring 20'. Rotor blades 26' may extend radially through thermal insulation structure 66 such that the tips of blades 26' are exposed from the exterior thereof. Such a design permits controlled heat loss through the tips of blades 26' via convective heat transfer and/or via radiative transfer to a line-of-sight structure 68. If desired, line-of-sight structure 68, the body of thermal insulation structure 66, and/or the interior volume enclosed by insulation structure 66 can be actively cooled by an active cooling device 70, while DAT wheel 10' is heated in the above-described manner. Active cooling device 70 can be, for example, one or more fans, pumps, impingement cooling jets, or other devices for directing a cooling fluid through or against any of the aforementioned components. In further embodiments, various other passive and/or active cooling techniques can be employed to create the desired temperature profile within DAT wheel 10'. For example, in another implementation, blade ring 20' can be physically contacted with a chiller plate or other heat sink.

After completing the differential heat treatment process at STEP 46, additional heat treatment steps (e.g., aging and quenching) can be performed, as appropriate, to complete heat treatment of the bonded dual alloy rotor (STEP 48, FIG. 3). Afterwards, exemplary method 40 advances to STEP 50 (FIG. 3) during which any final processing steps are carried-out to complete fabrication of the bonded dual alloy rotor. Such steps may include further heat treatment steps, the application of a coating or coating system (if not previously applied), and additional machining to create the more detailed or refined features of the finished rotor. With respect to DAT wheel 10 shown in FIGS. 1, 2, and 4, specifically, hub disk 12 may be machined to remove outer sacrificial portions 62 and impart disk 12 with its final geometry. Additionally, inter-blade cut-out 30 may be formed in DAT wheel 10 utilizing electrical discharge machining or another material removal process.

The foregoing has provided embodiments of a manufacturing process for producing a bonded dual alloy rotor, such as a dual alloy turbine wheel or compressor wheel. During the above-described manufacturing process, heat transfer to and from the bonded dual alloy rotor is controlled such that the hub disk is heated to processing temperatures equal to or greater than a pre-established minimum process temperature for the hub disk, while at least a volumetric majority of each of the rotor blades is maintained at temperatures below a pre-established maximum critical temperature. In certain embodiments, the bonded dual alloy rotor may be actively heated in certain regions, while simultaneously actively and/or passively cooled in the rotor rim region to create an optimized radially-varied temperature profile through the rotor during the heat treatment process. This, in turn, may allow the high temperature strength and service lifespan of the hub disk to be maximized, while further maintaining optimal metallurgical properties in the rotor blades and/or rim and the integrity of the blade coating (if present) through the heat treatment process.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A method for processing a bonded dual alloy rotor that includes rotor blades composed of a first alloy that are bonded to a hub disk composed of a second alloy different than the first alloy, the method comprising the steps of:

performing a differential heat treatment process on the bonded dual alloy rotor during which the hub disk is heated to processing temperatures equal to or greater than a minimum processing temperature ($T_{DISK\_PROCESS\_MIN}$), while at least a volumetric majority of each of the rotor blades is maintained at temperatures below a maximum critical temperature ($T_{BLADE\_MAX}$), wherein $T_{BLADE\_MAX}$ is less than $T_{DISK\_PROCESS\_MIN}$.

2. The method of claim 1 wherein performing the differential heat treatment process comprises:

heating the hub disk to processing temperatures equal to or greater than $T_{DISK\_PROCESS\_MIN}$ over a peak heating period; and controlling heat transfer to and from the bonded dual alloy rotor during the differential heat treatment process such the magnitude of any temperature gradient occurring within the hub disk over the peak heating period is less than the difference between $T_{DISK\_PROCESS\_MIN}$ and $T_{BLADE\_MAX}$.

3. The method of claim 1 wherein obtaining comprises obtaining the hub disk in an enlarged heat treatment form including an outer sacrificial portion and an inner final geometry portion, and wherein performing the differential heat treatment process comprises:

heating the hub disk to processing temperatures equal to or greater than $T_{DISK\_PROCESS\_MIN}$ over a peak heating period; and controlling heat transfer to and from the bonded dual alloy rotor during the differential heat treatment process such that the average temperature of the outer sacrificial portion of the hub disk is greater than the average temperature of the inner final geometry portion over the peak heating period.

4. The method of claim 1 wherein the rotor blades form a blade ring bonded to the hub disk along an annular bond line, and wherein performing the differential heat treatment process comprises:

applying a maximum heat load to the bonded dual alloy rotor at a first location proximate the bond line; and simultaneously applying a minimum heat load to the bonded dual alloy rotor at a second location radially inboard of the first location.

5. The method of claim 1 wherein performing the differential heat treatment process comprises:

applying a first heat load to a first region of the bonded dual alloy rotor, while simultaneously applying a second heat load to a second region of bonded dual alloy rotor radially inboard of the first region of the bonded dual alloy rotor, the second head load less than the first heat load.

6. The method of claim 5 wherein applying comprises:

placing the bonded dual alloy rotor in an induction furnace containing at least first and second induction coils; and controlling the first and second induction coils to induce the first and second heat loads in the first and second regions of the bonded dual alloy rotor, respectively.

7. The method of claim 1 wherein performing the differential heat treatment process on the bonded dual alloy rotor comprises:

applying a heat load to the hub disk, while thermally insulating at least a portion of the rotor blades.

8. The method of claim 7 wherein thermally insulating at least a portion of the rotor blades comprises positioning a thermal insulation structure around the bonded dual alloy rotor prior to applying the heat load to the hub disk, the thermal insulation structure enclosing at least a volumetric majority of the plurality of blades.

9. The method of claim 8 wherein the rotor blades having blade tips and extend radially through the thermal insulation structure such that the blade tips are exposed from the exterior of the thermal insulation structure.

10. The method of claim 1 wherein performing the differential heat treatment process on the bonded dual alloy rotor comprises:

heating the bonded dual alloy rotor, while actively cooling at least one of the group consisting of (i) the rotor blades and (ii) a line-of-sight structure to which the rotor blades radiate heat.

11. The method of claim 1 wherein the rotor blades have blade tips, wherein the bonded dual alloy rotor has a centerline, and wherein performing the differential heat treatment process on the bonded dual alloy rotor comprises:

creating a radially-varied temperature profile within the bonded dual alloy rotor, the radially-varied temperature profile increasing in a non-linear manner when moving from the blade tips to the centerline.

12. The method of claim 11 wherein the radially-varied temperature profile has a median temperature zone located within the rotor blades.

13. The method of claim 12 wherein the rotor blades form a blade ring bonded to the hub disk along an annular bond line, and wherein the median temperature zone is located closer to the annular bond line than to the blade tips.

14. A method for processing a bonded dual alloy rotor that includes rotor blades composed of a first alloy that are bonded to a hub disk composed of a second alloy different than the first alloy, the method comprising the steps of:

heating the hub disk to processing temperatures equal to or greater than $T_{DISK\_PROCESS\_MIN}$ over a peak heating period; and simultaneously maintaining at least a volumetric majority of each of the rotor blades at temperatures below a maximum critical temperature ($T_{BLADE\_MAX}$), wherein $T_{BLADE\_MAX}$ is less than $T_{DISK\_PROCESS\_MIN}$.

15. The method of claim 14 further comprising:

controlling heat transfer to and from the bonded dual alloy rotor such the magnitude of any temperature gradient occurring within the hub disk over the peak heating period is less than the difference between $T_{DISK\_PROCESS\_MIN}$ and $T_{BLADE\_MAX}$.

16. The method of claim 15 wherein the hub disk includes an outer sacrificial portion and an inner final geometry portion, and wherein process further comprises:

controlling heat transfer to and from the bonded dual alloy rotor during the differential heat treatment process such that the average temperature of the outer sacrificial portion of the hub disk is greater than the average temperature of the inner final geometry portion over the peak heating period.

* * * * *